(12) United States Patent
Boetzel et al.

(10) Patent No.: US 7,830,856 B2
(45) Date of Patent: Nov. 9, 2010

(54) DATA TRANSMISSION SYSTEM, FRAME STRUCTURE, AND METHOD FOR RADIO TRANSMISSION OF DATA

(75) Inventors: Ulrich Boetzel, Kaarst (DE); Christian Kranz, Ratingen Lintorf (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 2231 days.

(21) Appl. No.: 10/629,948

(22) Filed: Jul. 30, 2003

(65) Prior Publication Data

US 2004/0105405 A1 Jun. 3, 2004

Related U.S. Application Data

(63) Continuation of application No. PCT/DE02/00450, filed on Jan. 30, 2002.

(30) Foreign Application Priority Data

Jan. 30, 2001 (DE) ................................ 101 03 927

(51) Int. Cl.
   *H04J 3/00* (2006.01)
(52) U.S. Cl. ................... 370/345; 370/458; 370/465
(58) Field of Classification Search ............... 370/321, 370/345, 458, 465
   See application file for complete search history.

(56) References Cited

U.S. PATENT DOCUMENTS 4,864,640 A   9/1989   Roza
5,959,980 A   9/1999   Scott
6,049,538 A   4/2000   Scott
6,388,997 B1 *   5/2002   Scott ........................ 370/280
6,928,065 B2 *   8/2005   Logalbo et al. ............ 370/337
6,975,613 B1 * 12/2005   Johansson .................. 370/338
7,035,232 B1 *   4/2006   Suzuki ....................... 370/320
2002/0018458 A1 *   2/2002   Aiello et al. ................ 370/348
2002/0141478 A1 * 10/2002   Ozluturk et al. ............ 375/130
2003/0109228 A1 *   6/2003   Muller et al. ................. 455/88

FOREIGN PATENT DOCUMENTS

| DE | 197 47 457 C2 | 4/1999 |
| EP | 0 295 227 A1 | 12/1988 |
| EP | 0 670 640 A2 | 9/1995 |
| EP | 0 926 845 A2 | 6/1999 |
| WO | 99/37106 | 7/1999 |

OTHER PUBLICATIONS

Haartsen, J. C.: "The Bluetooth Radio System", IEEE Personal Communications, vol. 7, No. 1, Feb. 2000, pp. 28-36.
Kalia, M. et al.: "MAC Scheduling and SAR policies for Bluetooth: A Master Driven TDD Pico-Cellular Wireless System", International Workshop on Mobile Multimedia Communications, IEEE, Nov. 15, 1999, pp. 384-388.

* cited by examiner

*Primary Examiner*—Kevin C Harper
*Assistant Examiner*—Sai-Ming Chan
(74) *Attorney, Agent, or Firm*—Laurence A. Greenberg; Werner H. Stemer; Ralph E. Locher

(57) ABSTRACT

A data transmission system transmits first data bursts from a base station to mobile stations. The first data bursts at least in some cases contain two or more data blocks that are intended for different mobile stations. The data transmission system furthermore transmits second data bursts from at least one of the mobile stations to the base station and produces guard time intervals between successive data bursts.

31 Claims, 3 Drawing Sheets

DATA TRANSMISSION SYSTEM, FRAME STRUCTURE, AND METHOD FOR RADIO TRANSMISSION OF DATA

CROSS-REFERENCE TO RELATED APPLICATION

This application is a continuation of copending International Application No. PCT/DE02/00450, filed Jan. 30, 2002, which designated the United States and was not published in English.

BACKGROUND OF THE INVENTION

Field of the Invention

The invention relates to a system for wireless transmission of data between a base station and at least two mobile stations, a frame structure, and a method for radio transmission of data.

Data transmission systems in which data is interchanged without the use of wires over short distances of only a few meters between a base station and mobile stations are referred to as piconetworks. The frequencies available for data transmission in piconetworks are defined by the ISM frequency bands (Industrial, Scientific, and Medical). The ISM frequency bands are reserved for use, based on radio and without licenses, at low transmission powers.

A data transmission from the base station to the mobile stations is referred to as a downlink. The converse case, of data transmission from the mobile stations to the base station, is referred to as an uplink. Time slot methods are normally used for data transmission. In time slot methods, time slots with a specific time duration are assigned to the downlinks and uplinks. The TDMA (time division multiple access) method is frequently used as a multiple access method for time slot methods, and the TDD (time division duplex) method is used as a duplexing method in order to form a bidirectional channel between the base station and the mobile stations.

In previous data transmission systems based on a time slot method, each data block which is intended to be transmitted from the base station to a specific mobile station or from one of the mobile stations to the base station is allocated one time slot. A time slot method such as this is described, by way of example, in the "Bluetooth Specification Version 1.0B", in Chapter 2, "Physical Channel", (Internet Address "www-.bluetooth.com/developer/specification/Bluetooth_11_Specifications_Book.pdf" and in particular in Chapter 2.3 "Time Slots" (pages 43, 44) there. When successive data burst are transmitted from different stations, it will be possible for the data blocks to overlap in time owing to the asynchronous transmission cycles of the stations. In order to compensate for such an overlap of the data burst originating from different stations, guard time intervals are planned in between the transmission of the individual data bursts. In the following text, the expression data burst means a sequence of one or more data blocks transmitted without any interruption. No data transmission takes place during the guard time intervals.

The Standard defined by the Federal Communications Commission (FCC) for the use of the ISM frequency bands (Internet Address www.fcc.gov/oet/info/rules/part15/) defines a frequency hopping method (Frequency Hopping Spread Spectrum) and stipulates how may frequency changes must take place within the specific time intervals. The rules relating to this can be found in Section 15.247 of the FCC rules, in particular in Section 15.247 (1) (ii) there. In frequency hopping methods, the transmission frequency is changed once a specific number of data blocks have been transmitted. Every change in the transmission frequency results in the frequency synthesizer requiring time to stabilize the new transmission frequency. The stabilization times must be taken into account in the length of the guard time intervals between the data blocks.

The transmission pauses which are forced to occur by the guard time intervals disadvantageously reduce the data transmission rate. Furthermore, the guard time intervals result in long latency times. The expression latency times in this context means the times that pass from the start of transmission of a data block to a specific station to the reception of the response from this station. These latency times are particularly critical in systems with real-time requirements.

SUMMARY OF THE INVENTION

It is accordingly an object of the invention to provide a data transmission system, a frame structure, and a method for radio transmission of data that overcome the hereinaforementioned disadvantages of the heretofore-known devices of this general type and that allow a high data transmission rate, and in which the latency times are reduced.

With the foregoing and other objects in view, there is provided, in accordance with the invention, a data transmission system. The data transmission system includes a base station and at least two mobile stations in a piconetwork for interchanging data bursts successively by radio using a time slot method. A transmitter of the base station is configured to transmit first data bursts to the mobile stations. At least some of the first data bursts contain at least two data blocks intended for different ones of the mobile stations. The transmitter is configured to produce identification information for the piconetwork only at a start of a transmission of each of the first data bursts. Each of the mobile stations has a transmitter configured to transmit a group of second data bursts containing a data block intended for the base station. The transmitter is configured to produce identification information for the piconetwork at a start of a transmission of the second data bursts. A device produces a guard time interval between the data bursts.

With the objects of the invention in view, there is also provided a frame structure for radio transmission of data bursts between a base station and at least two mobile stations in a piconetwork. The frame structure includes first data bursts transmitted from the base station to the mobile stations, with at least some of the first data burst containing at least two data blocks. Each of the data blocks is intended for different mobile stations, and further contains identification information for the piconetwork at a start of each of the first data bursts. Second data bursts are transmitted from a respective one of the mobile stations to the base station. Each of the second data bursts contain a data block intended for the base station and containing identification information for the piconetwork at a start of each of the second data bursts. Guard time intervals bare provided between successive data bursts.

With the objects of the invention in view, there is also provided a method for radio transmission of data in a piconetwork between a base station and at least two mobile stations The first step of the method is transmitting a first data burst from the base station to the mobile stations. The first data burst contains at least two data blocks, each intended for a different one of the mobile stations, and including transmitting identification information for the piconetwork only at a start of a transmission of the first data burst. The next step is providing a guard type interval. The next step is transmitting the second data bursts from one of the mobile stations to the base station. Each of the second data bursts contains a data block intended for the base station. Each of the mobile stations transmits identification information for the piconetwork at a start of a transmission of the second data bursts.

A data transmission system according to the invention includes a base station and at least two mobile stations, between which data bursts are interchanged by radio, using a time slot method. One major idea of the invention is for the data transmission system to have a transmitter for transmission of first data bursts from the base station to mobile stations, with at least some of the first data bursts containing two or more data blocks which are intended for different mobile stations. Furthermore, the data transmission system includes a transmitter for transmission of second data bursts from at last one of the mobile stations to the base station. The second data bursts contain data blocks that are intended for the base station. Guard time intervals, which are produced by suitable devices, are provided between successive date bursts.

The transmitters for transmission of the data bursts and devices for production of the guard time intervals include, in particular, the transmitting and receiving devices in the base and mobile stations.

One advantage of the data transmission system according to the invention is that two or more data blocks that are intended for different mobile stations can be transmitted using a single, first data burst. Thus, there is no need to provide guard time intervals between the data blocks that are intended for the various mobile stations. Since the data blocks that are intended for different mobile stations are transmitted in the first data burst from only one transmitter, namely the base station, the guard time intervals for compensation for asynchronous transmission cycles may be omitted. This results in a high data transmission rate.

A further advantage is that, during the transmission of a first data burst, common information (for example, identification information for the piconetwork) may be transmitted only once for two or more data blocks, at the start of the data burst. This makes it possible to make better use of the available bandwidth.

The invention makes it possible to shorten the transmission time for a frame, and to shorten the latency time. The data transmission system according to the invention is thus particularly suitable for use in systems with real-time requirements.

One frame can be defined for repeated, identically structured transmission sequences between the base station and specific mobile stations. For example, one frame may contain a first data burst, which contains data blocks for specific mobile stations and, subsequently, two or more second data bursts, which are transmitted from specific mobile stations to the base station. The data transmission system according to the invention reduces the transmission time for a frame such as this, thus shortening the latency times.

One preferred refinement of the invention provides for the base station and each mobile station to each have a local oscillator. During transmission operation, the frequency of the local oscillator is used to up-mix the baseband signals to the transmission frequency. During reception operation, received signals are down-mixed by the local oscillator frequency to an intermediate frequency band. Local oscillators may be in the form of low-cost electronic components.

The local oscillators are advantageously each included in a phase locked loop (PLL). The phase locked loop controls the frequency of the local oscillator at the frequency of a reference oscillator, to be precise sufficiently accurately that the phase difference is maintained. The phase locked loop cannot only receive the frequency, but also can produce a desired frequency. The use of a phase locked loop makes it possible to match the receiver-end oscillator frequency to the transmission frequency.

According to one particularly preferred refinement of the invention, first data bursts and groups of second data bursts are transmitted alternately. In this case, it is possible to provide for a first data burst and a subsequent group of that second data bursts to be transmitted at different frequencies, and/or for a group of second data bursts and a subsequent first data burst to be transmitted at different frequencies. Furthermore, the transmission frequency is preferably kept constant during the transmission of a first data burst and during the transmission of a group of second data bursts. This measure means that the local oscillators need to be stabilized to a new transmission frequency only when changing from the first to second data bursts or from the second to first data bursts. The stabilization times make it necessary to provide relatively long guard time intervals. Since the transmission frequency is not changed during the transmission of a group of second data bursts, the guard time intervals between successive second data bursts may, in contrast, be relatively short, since no stabilization process has taken place. This correspondingly increases the data transmission rate.

A guard time interval with the same length as that between a second data burst and a subsequent first data burst is preferably provided between a first data burst and a subsequent second data burst. The FCC rules for the ISM frequency bands require a specific number of frequency changes within specific time intervals. The guard time intervals may be used for changing to a new transmission frequency. It is also possible to provide for the guard time intervals to have the same lengths between successive second data bursts. The purpose of these guard time intervals is protection against time overlapping of second data bursts as a result of any asynchronous transmission cycles of the stations, for example as a result of clock drift. These guard time intervals between successive second data bursts are generally shorter than the guard time intervals between first and second data bursts, since there is no need for the stabilization of the oscillators in this case.

One particularly preferred refinement of the invention is characterized in that the transmitters each produce identification information for the piconetwork at the start of the transmission of each first and of each second data burst. An identification such as this identifies the respective receiver at the start of a transmission of a data burst which is intended for the associated piconetwork. According to the invention, the configuration of the data blocks, which are intended for different mobile stations in the single first data burst, means that there is no need to transmit identification information for each data block that is transmitted to a mobile station. This results in a higher data transmission rate.

According to a further advantageous embodiment of the invention, the first data bursts contain two or more data blocks, with one data block being provided for each of the mobile stations. Furthermore, it is advantageous for each of the mobile stations to provide a second data burst in each group of second data bursts. The advantage of this measure is standardization of the transmission sequence. Since each mobile station is addressed in each first data burst and each mobile station is allocated a time slot for transmission of the second data burst in a group of second data bursts, the transmission sequence is clearly structured. The alternative to this would be to check, before transmission of each first data burst and each group of second data bursts, the mobile stations to which data blocks are intended to be transmitted, and which of the mobile stations require a time slot for data transmission to the base station. Inhomogeneous frame structure such as this would make the latency time worse.

The data transmission system according to the invention can be used, for example, in short-range cordless communication systems. This will be advantageous for cordless telephones with two or more mobile parts. A further application possibility for computer-controlled games systems. In this case, the mobile stations would be the game pads of the individual players. Owing to the short latency time, the use of the data transmission system according to the invention is particularly advantageous for systems that are subject to real-time requirement. In the case of real-time systems, an input that is made at the mobile station end must be transmitted to the fixed station within a defined time interval, which cannot be exceeded. In a corresponding manner, a data block that is produced at the base station end must be transmitted to the mobile station in a time interval that cannot be exceeded. A real-time requirement such as this occurs in computer-controlled games systems.

The frame structure according to the invention is used for radio transmission of data bursts between a base station and at least two mobile stations. The frame structure has first data bursts, which are transmitted from the base station to mobile stations. At least some of the first data bursts contain two or more data blocks that are intended for different mobile stations. Furthermore, the frame structure has second data bursts, which are transmitted from at least one of the mobile stations to the base station. The second data bursts contain data blocks that are intended for the base station. The frame structure according to the invention has guard time intervals between successive data bursts.

The frame structure according to the invention has the advantage that there is no need to provide guard time intervals between the data blocks that are intended for the mobile stations. Since the data blocks that are intended for different mobile stations are transmitted in the first data burst by only one transmitter, namely the base station, there is no need for guard time intervals to compensate for asynchronous transmission cycles. This shortens not only the transmission time for a frame, but also the latency time.

Other features that are considered as characteristic for the invention are set forth in the appended claims.

Although the invention is illustrated and described herein as embodied in a data transmission system, a frame structure, and a method for radio transmission of data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
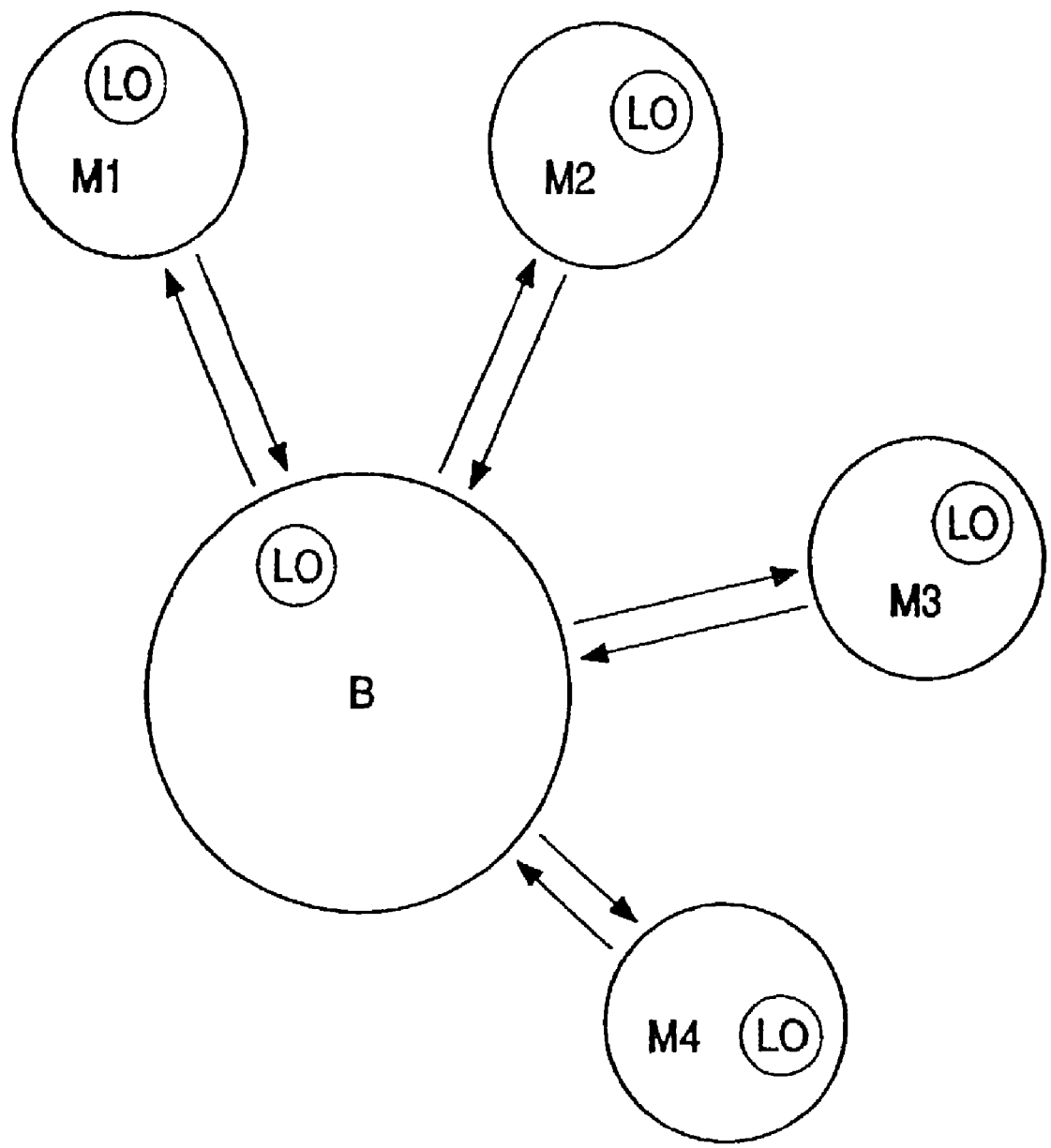
FIG. 1 is a schematic drawing showing the configuration of a data transmission system according to the prior art and including one base station and four mobile stations.

Referring now to the figures of the drawings in detail and first, particularly to FIG. 1 thereof, there is shown a data transmission system that includes one base station B and, for example, four mobile stations Mi (i=1, . . . , 4). The base station B can transmit data by radio to each of the mobile stations Mi. The mobile stations Mi can likewise transmit data by radio to the base station B. The base station B and the mobile stations Mi each have a local oscillator LO for data transmission for a radio. A data transmission system such as this including one base station and N mobile stations is referred to as a piconetwork, and has only a short range.

Figure 2:
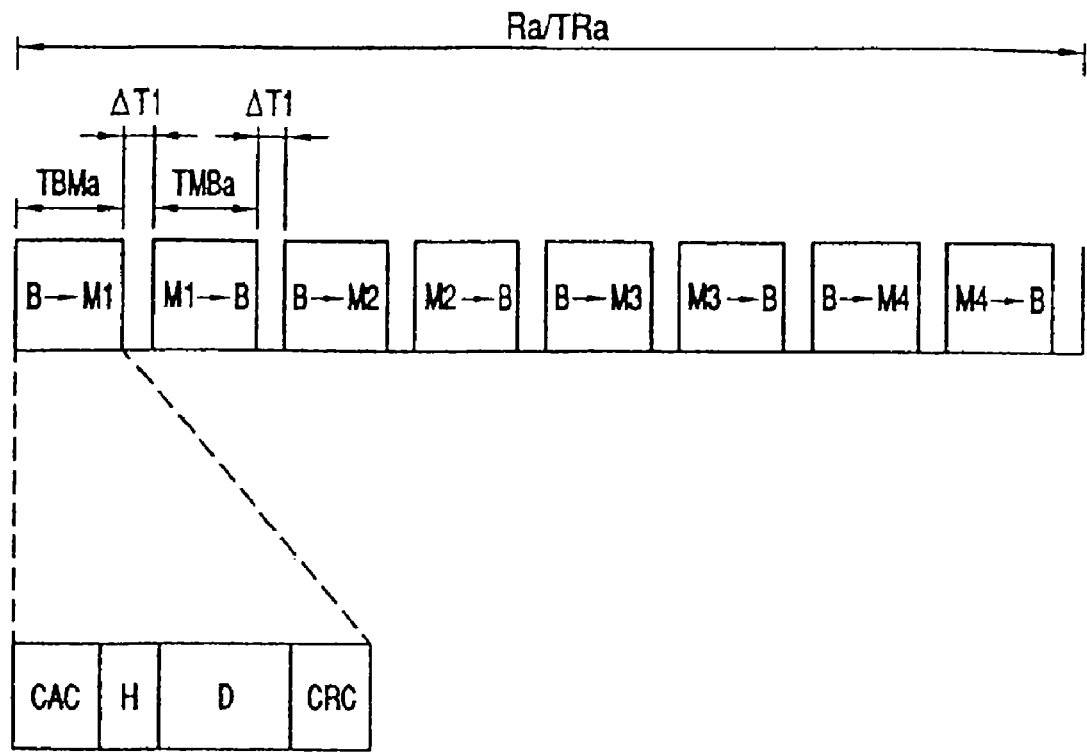
FIG. 2 is a chart showing a frame structure that is used for prior-art data transmission systems.

FIG. 2 shows a frame structure that is used, by way of example, in the Bluetooth Standard, in order to interchange data between the base station B ("Master") and the mobile stations Mi ("Slaves"). Within a frame Ra, data bursts are transmitted as downlinks from the base station B to each of the mobile stations Mi. After receiving a data burst, each of the mobile stations Mi transmits a data burst as an uplink to the base station B, alternating with the downlinks. Each data burst is allocated its own time slot. One time slot TBMa is available for the transmission of a data burst from the base station B to a mobile station Mi. A data burst is transmitted from a mobile station Mi to the base station B during a time slot TBMa. A guard time interval $\Delta T1$, during which no data is transmitted, is provided after each transmission of the data burst.

By way of example, it is possible to provide for the transmission frequency to be varied after each downlink or uplink. Guard time intervals $\Delta T1$ are provided between the transmission of individual data bursts in order to allow the local oscillators LO in the stations to stabilize at the new transmission frequency. If the transmission frequency is not changed between successive data bursts, the guard time intervals $\Delta T1$ are used to compensate for any asynchronous transmission cycles between the stations.

The frame structure which is shown in FIG. 2 allows the time Tra that is required for transmission of one frame Ra to be calculated using the following equation:

$$Tra = N \cdot (TBMa + TMBa + 2 \cdot \Delta T1) \qquad (1)$$

Equation (1) was based on the assumption of the more general situation, in which the data transmission system N has different mobile stations.

Each of the data bursts that are shown in FIG. 2 includes different groups of data and information. By way of example, in the Bluetooth Standard, identification information CAC (Channel Access Code) for the piconetwork is transmitted at the start of a data burst, followed by the actual data block that is to be transmitted, the header information H, payload data D and a checking bit pattern CRC (Cyclic Redundancy Check) for error identification and correction for the payload data D.

Figure 3:
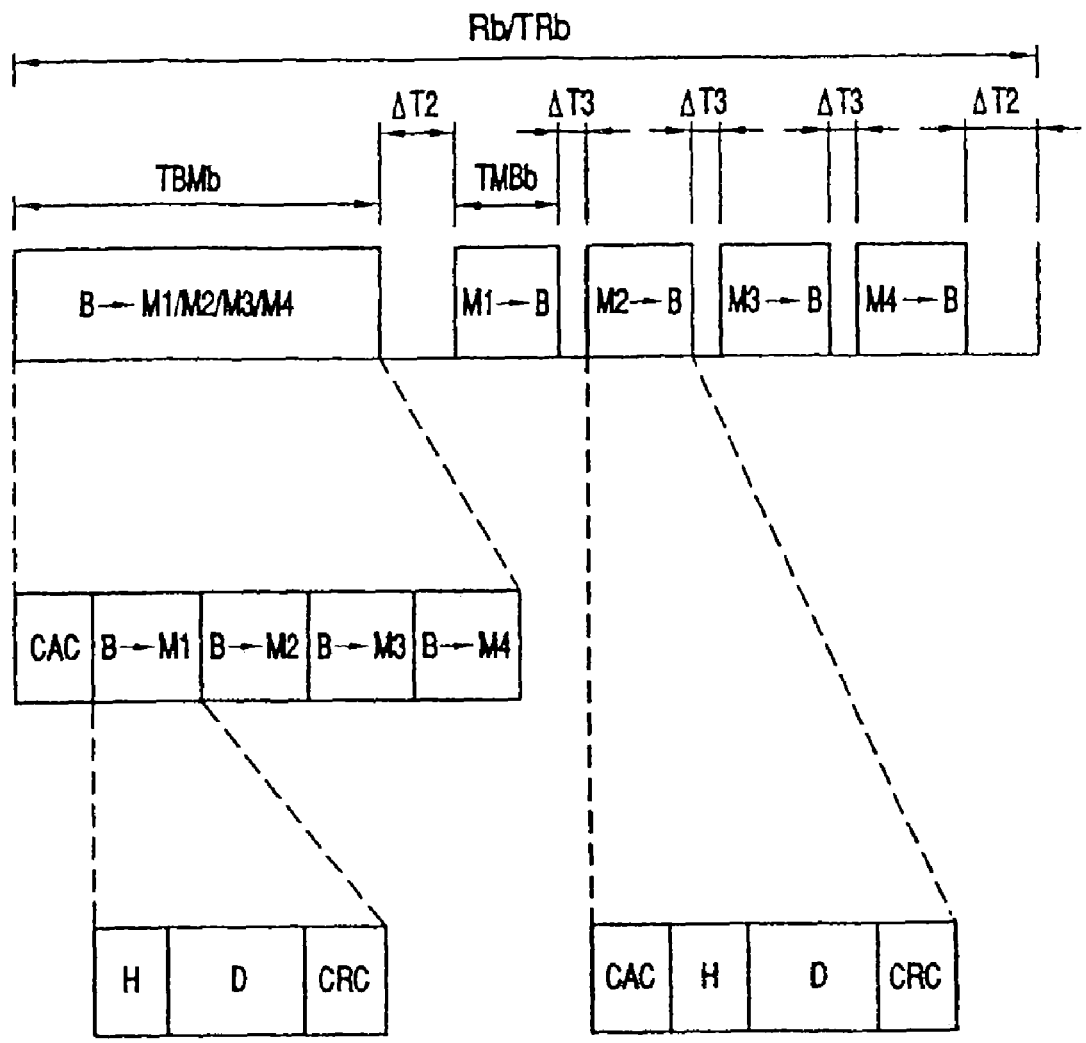
FIG. 3 is a chart showing a frame structure according to the invention.

As an exemplary embodiment of the invention, FIG. 3 shows the structure of a frame Rb which is transmitted between the base station B and the mobile stations Mi in a data transmission system according to the invention. A data block is in each case transmitted from the base station B to each of the mobile stations Mi as the downlink in a first data burst. The data block which is transmitted from the base station B to the mobile station M1 is annotated "B→M1" in FIG. 3. The data block which is transmitted from B to M2 is annotated in a corresponding way "B→M2" etc. A time slot TBMb is planned for the first data bust. The transmission of the first data burst is followed by a guard time interval ΔT2. During the guard time interval ΔT2, the local oscillators LO are stabilized at a new transmission frequency. After this, successive data bursts are transmitted from each of the mobile stations Mi to the base station B, as uplinks. One time slot TMBb is available for each of these data bursts. The transmission frequency remains constant during the transmission of the uplinks. Guard time intervals ΔT3 are provided between the uplinks in order, for example, to prevent any time overlap between the uplinks owing to asynchronous transmission cycles. The transmission of the uplinks is once again followed by a guard time interval ΔT2. During this time, the transmission frequency is changed for the transmission of a new frame Rb.

During the transmission of a frame Rb, it is necessary to ensure that the FCC regulations are complied with. This means that the time slots TBMb and TMBb which are provided for the data bursts are sufficiently short to make it possible to change the transmission frequency sufficiently frequently.

As in FIG. 2, the data blocks in the exemplary embodiment shown in FIG. 3 contain header information H, payload data D and a checking bit pattern CRC. The header information H for the data blocks "B→Mi", i=1, ..., 4, represents identification information for the respective mobile stations Mi and, in the Bluetooth Standard by way of example, includes a 3-bit address for the mobile station Mi. The header information H for the data blocks "Mi→B", i=1, ..., 4 is the identification information for the base station B, that is to say its address. At the start of a data burst, identification information CAC for the piconetwork is transmitted (in the Bluetooth Standard this is called CAC, the so-called Channel Access Code, which is formed by a 72-bit long sequence). For the general case with N mobile stations involved, the transmission time TRb for a frame Rb according to the invention is driven by the following equation:

$$TRb = TBMb + N \cdot TMBb + 2 \cdot \Delta T2 + (N-1) \cdot \Delta T3 \qquad (2)$$

In order to make it possible to compare equation (1) with the equation (2), it is assumed that the time slot TBMb for a first data burst according to the exemplary embodiment illustrated in FIG. 3 is the same as the N times time slot TBMa. Furthermore, the time slots TBMa, TMBa and TMBb should have the same lengths T. The guard time intervals ΔT1, ΔT2 and ΔT3 are likewise assumed to be identical with the same length ΔT. In consequence, equation (1) becomes:

$$Tra = 2 \cdot N \cdot T + 2 \cdot N \cdot \Delta T \qquad (3)$$

With the approximations mentioned above, equation (2) assumes the following form:

$$TRb = 2 \cdot N \cdot T + (N+1) \cdot \Delta T \qquad (4)$$

According to equations (3) and (4), the transmission time TRb for the exemplary embodiment according to the invention is shorter than the transmission time TRa as shown in FIG. 2, provided that the data transmission system has at least two mobile stations Mi. This shortening results from the saving of guard time intervals between the data blocks in the first data burst in FIG. 3.

The comparison of equations (3) and (4) has not yet taken into account the fact that the transmission of N−1 identification information CAC does not take place in the first data burst according to the invention. This likewise shortens the transmission time TRb compared to TRa.

In summary, a TDMA and a TDD structure with bidirectional channels between the mobile stations Mi and the base station B is created, which to this extent is "asymmetric" with separate unidirectional channels being used for the uplink and a common channel with dynamic allocation of the data rate being used for the downlink.

We claim:

1. A data transmission system, comprising:
   a base station and at least two mobile stations in a piconetwork for interchanging data bursts successively by radio using a time slot method;
   a transmitter of said base station being configured to transmit first data bursts to said mobile stations, at least some of the first data bursts containing at least two data blocks intended for different ones of said mobile stations, said transmitter being configured to produce identification information for said piconetwork only at a start of a transmission of each of the first data bursts;
   each of said mobile stations having a transmitter configured to transmit a group of second data bursts containing a data block intended for said base station, said transmitter being configured to produce identification information for said piconetwork at a start of a transmission of the second data bursts;
   said first data bursts and groups of the second data bursts being transmitted alternately; and
   a device for producing a guard time interval between the data bursts.

2. The data transmission system according to claim 1, wherein said base station and each of said mobile stations have a local oscillator.

3. The data transmission system according to claim 2, wherein each of said local oscillators is connected to a respective phase locked loop.

4. The data transmission according to claim 1, wherein at least one of:
   the first data burst and a subsequent one of the groups of the second data bursts are at different transmission frequencies, and
   one of the groups of the second data bursts and a subsequent one of the first data bursts are at different transmission frequencies.

5. The data transmission system according to claim 4, wherein one of the transmission frequency of the first data burst and the group of the second data bursts is constant during a transmission.

6. The data transmission system according to claim 1, wherein the guard time interval between one of the first data bursts and a subsequent one of the second data bursts is equal to the guard time interval between the one of the second data bursts and the subsequent one of the first data bursts.

7. The data transmission system according to claim 1, wherein the guard time intervals between successive second data bursts have equal lengths.

8. The data transmission system according to claim 1, wherein:
   the first data bursts contain at least two data blocks, with one data block being provided for each of said mobile stations, and
   a second data burst from each of said mobile stations is in each case provided in the group of the second data bursts.

9. The data transmission system according to claim 1, wherein said data transmission system can be used in a system with real-time requirements selected from the group consisting of a cordless communication system, and a computer-controlled entertainment system, a computer-controlled game system.

10. A data transmission system for radio transmission of a frame structure of data bursts between a base station and at least two mobile stations in a piconetwork, comprising:
   a transmitter of the base station being configured to transmit first data bursts transmitted from the base station to the mobile stations, with at least some of said first data burst containing at least two data blocks, each of said data blocks being intended for different mobile stations, and further containing identification information for the piconetwork only at a start of each of said first data bursts;
   each of the mobile stations including a transmitter configured to transmit a group of second data bursts transmitted from a respective one of the mobile stations to the base station, each of said second data bursts containing a data block intended for the base station and containing identification information for the piconetwork at a start of each of the second data bursts;
   said first data bursts and said groups of second data bursts being transmitted alternately; and
   a device for producing guard time intervals between successive data bursts.

11. The data transmission system according to claim 10, wherein the base station and each of the mobile stations each have a local oscillator.

12. The data transmission system according to claim 11, wherein a respective phase locked loop is connected to each of the local oscillators.

13. The data transmission system according to claim 10, wherein at least one of:
   said first data bursts and a subsequent group of said second data bursts are at different transmission frequencies, and
   a group of said second data bursts and subsequent first data bursts are at different transmission frequencies.

14. The data transmission system according to claim 13, wherein the transmission frequency of at least one of said first data bursts and said group of second data bursts is constant during the transmission.

15. The data transmission system according to claim 10, wherein a guard time interval between said first data bursts and subsequent second data bursts equals a guard time interval between said second data bursts and subsequent first data bursts.

16. The data transmission system according to claim 10, wherein guard time intervals between said successive second data bursts have equal lengths.

17. The data transmission system according to claim 10, wherein:
   said first data bursts contain two or more data blocks, with one of said data blocks being provided for each of said mobile stations; and
   said second data bursts include a data burst from each of said mobile stations.

18. The data transmission system according to claim 10, wherein the data transmission system has a real-time requirement and the data transmission system is selected from the group consisting of a cordless communication system, a computer-controlled entertainment system, and a computer-controlled game system.

19. A method for radio transmission of data bursts in a piconetwork between a base station and at least two mobile stations, which comprises the steps:
   (a) transmitting first data bursts from the base station to the mobile stations, the first data bursts containing at least two data blocks each intended for a different one of the mobile stations, including transmitting identification information for the piconetwork only at a start of a transmission of the first data bursts;
   (b) providing a guard time interval;
   (c) transmitting second data bursts from one of the mobile stations to the base station, each of the second data bursts containing a data block intended for the base station, each of the mobile stations transmitting identification information for the piconetwork at a start of a transmission of the second data bursts; and
   (d) transmitting the first data bursts and groups of second data bursts alternately.

20. The method according to claim 19, which further comprises transmitting and receiving data bursts with the base station and each of the mobile stations by using respective local oscillators.

21. The method according to claim 20, which further comprises connecting a phase locked loop to each of the local oscillators.

22. The method according to claim 21, wherein at least one of:
   the first data burst and a subsequent group of the second data bursts are at different transmission frequencies; and
   a group of the second data bursts and a subsequent first data burst are at different transmission frequencies.

23. The method according to claim 22, which further comprises keeping the transmission frequency constant during one of a transmission of the first data burst and a transmission of the group of the second data bursts.

24. The method according to claim 19, wherein:
   the guard time interval is between the first data burst and a subsequent one of the second data bursts, and
   the guard time interval has an equivalent length as between one of the second data bursts and a subsequent first data burst.

25. The method according to claim 19, which further comprises providing guard time intervals of an equivalent length between successive second data bursts.

26. The method according to claim 19, which further comprises:
   in the first data bursts, providing at least two data blocks, one of the data blocks being provided for each of the mobile stations; and
   providing a second data burst from each of the mobile stations in each of the group of second data bursts.

27. The method according to claim 19, which further comprises using the method in a system with real-time requirements selected from the group consisting of a cordless communication systems, a computer-controlled entertainment system, and a computer-controlled games system.

28. A data transmission system, comprising:
   a base station and at least two mobile stations in a network for interchanging data bursts by radio using a time slot method;
   a transmitter of said base station being configured to transmit a first data burst to said mobile stations, said first data burst containing at least two data blocks intended for different ones of said mobile stations, said transmitter being configured to produce identification information for said network only at a start of a transmission of said first data burst;
   each of said mobile stations having a transmitter configured to transmit a group of second data bursts containing a data block intended for said base station, said transmitter being configured to produce identification information for said network at a start of a transmission of the second data bursts;

said first data burst and groups of the second data bursts being transmitted alternately; and a device for producing a guard time interval between the data bursts.

29. The data transmission system of claim 1, wherein the time slot of one of the first data bursts corresponds to an integer multiple N of the time slot of one of the second data bursts, N being equal to the number of mobile stations.

30. The data transmission system of claim 1, wherein the identification information for said piconetwork is a Channel Access Code as defined in a Bluetooth Standard.

31. The data transmission system of claim 1, each data block of the first and second data bursts including header information payload data and a checking bit pattern;

the header information of the data blocks of the first data bursts including an address for the respective mobile station;

the header information of the data blocks of the second data bursts including an address for the base station.

* * * * *